3,491,085
2'- AND 3'-KETO NUCLEOSIDES AND PROCESS FOR PREPARING SAME
Alan F. Cook, Palo Alto, and John G. Moffatt, Los Altos, Calif., assignors to Syntex Corporation, Panama, Panama, a corporation of Panama
No Drawing. Filed Dec. 14, 1966, Ser. No. 601,573
Int. Cl. C07d 51/52, 51/54; A61k 27/00
U.S. Cl. 260—211.5       9 Claims

ABSTRACT OF THE DISCLOSURE

2'- and 3'-keto nucleosides are intermediates for the process of making 2'- and 3'- inverted configuration sugar analogs of nucleosides and 2'- and 3'-tritiated nucleosides. The novel 2'- and 3'-keto compounds may be reduced to the corresponding 2'- and 3'-hydroxy derivatives which are known in the art to have utility as biologically active antimetabolite.

---

This invention relates to novel organic compounds and to the prepartion thereof. It more particularly pertains to novel keto derivatives of ribonucleosides.

The compounds of the present invention can be represented by the following structural Formulas A and B:

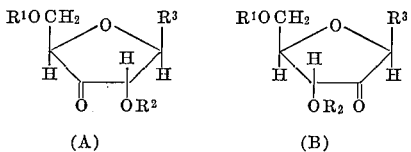

wherein, in each of Formulas A and B,
each of $R^1$ and $R^2$ is hydrogen, trityl, substituted trityl, or alkanoyl and
$R^3$ is a purine or pyrimidine base of the structure:

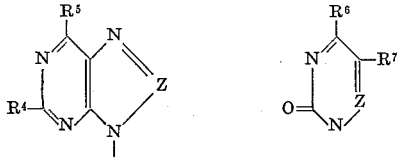

wherein $R^4$ is hydrogen, hydroxy or amino;
each of $R^5$ and $R^6$ is hydroxy or amino;
$R^7$ is hydrogen, halo, methyl, or trifluoromethyl; and
Z is methylidyne or a nitrogen atom.

The purine and pyrimidine bases defined by $R^3$ in the above Formulas A and B can possess normal ring structure in which Z is methylidyne including, for example, adenine, cytosine, 5-bromocytosine, 5-chlorocytosine, 5-methylcytosine, 5-trifluoromethylcytosine, guanine, 2,6-diaminopurine, thymine, uracil, 5-bromouracil, 5-chlorouracil, 5-trifluoromethyluracil, xanthine, hypoxanthine, and the like as well as the corresponding 8-azapurine and 6-azapyrimidine derivatives. Particularly preferred bases are adenine, cytosine, guanine, thymine, and uracil.

The novel compounds of the instant invention are valuable intermediates for preparing compounds with known and recognized uses. Thus, the keto functions can be reduced to the various inverted configuration sugar analogs of nucleosides. By utilizing a radioactive labelled reducing agent in these reductions, such as $^3H$ labelled sodium borohydride, nucleosides are obtained with radioactive sugar moieties. The keto groups of the instant compounds can be reacted with organometallic reagents to give useful nucleoside analogs.

Particularly noteworthy is the reduction of 2'-ketocytidine, prepared in accordance herewith, to the biologically active antimetabolite arabinosylcytosine.

The instant compounds are prepared from the corresponding 2'- or 3'-hydroxy compound by treatment thereof with an oxidizing agent, such as acetic anhydride, phosphorus pentoxide, or an N,N'-dialkylcarbodiimide, for example, N,N'-dicyclohexylcarbodiimide, utilizing a dialkylsulfoxide solvent, preferably, dimethylsulfoxide, at from room temperature to about 100° C., preferably, from about room temperature to about 60° C., for a period of time of from one or two hours to about 16 hours.

The 2'- and 3'-hydroxy derivatives are prepared for this purpose initially by subjection of the corresponding 2',3',5'-trihydroxy nucleoside to selective etherification procedures. One such etherification procedure involves forming the ditrityl derivatives in a similar manner as that described by Yung and Fox, Journal of the American Chemical Society, 83, 3060 (1961). By this procedure the 2',5'-ditrityl and 3',5'-ditrityl ethers are prepared and can be separated and isolated by column chromatography on silica eluting with chloroform:ethyl acetate.

After the oxidation to the respective 2'- or 3'-keto nucleoside has been achieved, these trityl ether groups are conveniently removed by acid hydrolysis in organic solution.

The starting materials for the above procedures are known.

Further elaboration of the thus prepared keto nucleosides of this invention can be accomplished by treatment thereof with organometallics, such as lithium alkyls and Grignard reagents to give the corresponding C-alkyl derivatives. Reaction of the keto compounds with Whittig reagents enables the preparation of a series of 2'- and 3'- substituted derivatives. Treatment with hydroxylamine followed by conventional reduction affords the 2'- and 3'-amino compounds. Deoxy nucleosides can be formed by forming a tosyl hydrazone of the 2'- or 3'-keto compounds followed by reduction. As mentioned above, reduction of the keto nucleosides with $^3H$ labelled sodium borohydride yields radioactive labelled sugar analogues.

This reduction, whether or not performed with radioactive labelled reducing agents, makes possible the production of 2',3'-dihydroxy nucleosides of unnatural configuration. Thus, the ribose configuration is hereby convertible to the arabinose, xylose, and so forth, configurations. This elaboration can be applied to the compounds of the instant invention to make a wide variety of useful analogues readily available.

As a further embodiment of the thus described reduction with radioactive reducing agents, there can also be employed as starting oxo containing compounds the corresponding 5'-aldehyde nucleosides, such as are produced according to the procedure described in U.S. Patent 3,248,380. By reducing these 5'-aldehydes with $^3H$ labelled sodium borohydride according to the instant process, the corresponding 5'-hydroxy compounds containing a radioactive hydrogen label are produced. Thus, by virtue of this process, radioactive labels can be introduced at any of positions 2', 3', and 5' of the sugar nucleus.

Thus also presented by the instant invention is a novel process by which radioactive tritium labels can be introduced into a nucleoside nucleus by utilization of a tritium labelled reducing agent, such as $^3$H labelled sodium borohydride.

The following examples illustrate the manner by which this invention can be practiced and are not to be construed as limitations upon the overall scope thereof but rather as illustrations thereof.

EXAMPLE 1

To a solution of 15 g. of uridine in 150 ml. of anhydrous pyridine is added 3 equivalents of triphenylmethyl chloride and the mixture is allowed to stand at room temperature for 16 hours. Thereafter, the mixture is heated at 110° C. for 4 hours, after which time the pyridine is removed by evaporation. The residue is dissolved in chloroform (200 ml.) and extracted successively with water, 10% aqueous cadmium chloride solution, and again water. The chloroform solution is then dried over sodium sulfate, evaporated to dryness, and dissolved in a minimal amount of hot benzene. Ether is added to slight turbidity and the solution is allowed to stand, effecting crystallization, giving 2',5'-di-O-trityluridine. The mother liquors are applied to a silica column and eluted with chloroform:ethyl acetate (5:1) to give 3',5'-di-O-trityluridine.

EXAMPLE 2

To a suspension of 1.70 g. of phosphorus pentoxide in 85 ml. of dimethylsulfoxide are added 7.28 g. of 2',5'-di-O-trityluridine and the reaction mixture is heated at 60° C. with stirring for 2 hours. The solution is cooled, diluted with 100 ml. of ether, extracted with 2 portions each of aqueous sodium bicarbonate solution and water, dried over sodium sulfate, and evaporated. Crystallization from methanol yields 2',5'-di-O-trityl-3'-ketouridine.

Similarly, the substitution of acetic anhydride or an N,N'-dialkylcarbodiimide for phosphorus pentoxide in the above procedure and maintaining the reaction at room temperature for about 16 hours affords similar results.

EXAMPLE 3

A freshly prepared 0.4 N solution of hydrogen chloride in chloroform is added dropwise with stirring to a solution of 1.23 g. of 2',5'-di-O-trityl-3'-ketouridine in 20 ml. of chloroform at 0° C. over a period of 15 minutes. The solution is stirred at 0° C. for an additional 60 minutes. Centrifugation yields a precipitate which is collected, washed with several portions of ether by decantation, and dried in vacuo over potassium hydroxide to give 3'-ketouridine.

EXAMPLE 4

The 3',5'-di-O-trityluridine prepared via the procedure described in Example 1 is subjected to treatment analogous to that set forth in Examples 2 and 3 above yielding 2'-ketouridine.

In a like manner, by substituting adenosine, cytidine, guanosine, and ribofuranosylthymine in the foregoing procedures there are respectively obtained as final products of Example 3 above: 3'-ketoadenosine, 3'-ketocytidine, 3'-ketoguanosine, and 3'-keto-1-β-D-ribofuranosylthymine and as respective final products of Example 4 above: 2'-ketoadenosine, 2'-ketocytidine, 2'-ketoguanosine, and 2'-keto-1- -D-ribofuranosylthymine.

Likewise, by substituting 5 - chlorocytidine, 5 - fluorocytidine, 6-azacytidine, 5-chlorouridine, 5-fluorouridine, 5-trifluoromethyluridine, and 6-azauridine for the foregoing procedures there are respectively obtained as products of Example 3 above, 3'-keto-5-chlorocytidine, 3'-keto-5-fluorocytidine, 3'-keto-5-chlorouridine, 3'-keto-5-fluorouridine, 3'-keto-5-trifluoromethyluridine, and 3'-keto-6-azauridine and as respective products of Example 4 above, 2' - keto - 5 - chlorocytidine, 2' - keto-5-fluorocytidine, 2'-keto-5-chlorouridine, 2'-keto-5-fluorouridine, 2'-keto-5-trifluoromethyluridine, and 2'-keto-6-azauridine.

EXAMPLE 5

To a solution of 180 mg. of 2',5'-di-O-trityl-3'-ketouridine in 15 ml. of ethanol is added 287 mg. of sodium borohydride at room temperature and the mixture is allowed to react for a period of one hour. The solution is partitioned between chloroform and water, the chloroform layer being washed with 3 portions of water, dried over sodium sulfate, and evaporated to dryness. The residue is chromatographed on silica eluting with carbon tetrachloride:acetone (4:1) giving 2',5'-di-O-trityluridine and 2',5'-di-O-trityl-1-β-D-xylosyluracil which are recrystallized from ether.

Thereafter, the major product compound 2',5'-di-O-trityl-1-β-D-xylosyluracil is hydrolyzed with acid solution as described in Example 3 above giving 1-β-D-xylosyluracil.

Alternatively, 3'-ketouridine can be reduced with sodium borohydride according to the above procedure to give identical products.

EXAMPLE 6

The compound 3',5'-di-O-trityl-2'-ketouridine is reduced according to the procedure set forth in Example 5 above giving 3',5'-di-O-trityluridine and 3',5'-di-O-trityl-1-β-D-arabinosyluracil.

Acid hydrolysis of 3',5'-di-O-trityl-1-β-D-arabinosyluracil yields 1-β-D-arabinosyluracil.

Alternatively, 2'-ketouridine can be similarly reduced to give identical products.

In a like manner, by substituting the other 3'-keto- and 2'-ketonucleosides of this invention in lieu of the starting compounds of Examples 5 and 6 above, the corresponding reduced nucleoside analogs are prepared.

EXAMPLE 7

By performing the above reductions using in lieu of sodium borohydride, $^3$H labelled sodium borohydride, the corresponding nucleoside analogs containing radioactive tritium labels specifically at C–2' and C–3' are produced, namely, 2',5'-di-O-trityl-3'-t-uridine, 2',5'-di-O-trityl-1-β-D-xylosyl - 3' - t-uracil, 3',5'-di-O-trityl-2'-t-uridine, and 3',5' - di-O-trityl-1-β-D-arabinosyl-2'-t-uracil which can be hydrolyzed to the corresponding free hydroxy compounds. Alternatively, the 2',5'-dihydroxy-3'-keto or 3',5'-dihydroxy-2'-keto compounds are reduced to the corresponding radioactive labelled compounds.

Similarly, $^3$H labelled sodium borohydride reduction of uridine-5'-aldehyde yields uridine containing the radioactive tritium label at C–5', namely, 5'-t-uridine.

In a like manner, the other 2'-keto- and 3'-keto-nucleosides contemplated by this invention and other 5'-aldehyde nucleosides are reduced to their respective radioactive labelled derivatives.

EXAMPLE 8

A mixture of 1 g. of 3'-ketouridine, 4 ml. of pyridine and 2 ml. of acetic anhydride is allowed to stand at room temperature for 15 hours. The mixture is then poured into ice water and the solid which forms is collected by filtration, washed with water and dried to yield 2',5'-di-O-acetyl-3'-ketouridine which may be further purified through recrystallization from acetone:hexane.

Similarly, by substituting the appropriate anhydride for acetic anhydride in the foregoing procedure there are prepared the corresponding alkanoyl derivatives.

In like manner, by substituting the other 3'-keto- and 2'-ketonucleosides for uridine in the foregoing procedures there are respectively obtained the corresponding 3'-keto- and 2'-ketonucleoside esters.

Upon substitution of 4-methoxyphenyldiphenylmethyl chloride for triphenylmethyl chloride in the procedure set forth in Example 1, the corresponding 4-methoxytrityl derivatives of the antecedent hydroxy compounds can be prepared. In like manner, other substituted trityl derivatives can be prepared.

What is claimed is:
1. A compound of the fomulas:

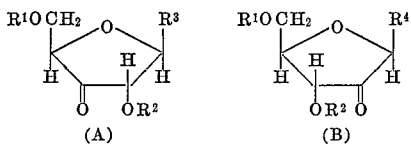

wherein, in each of Formulas A and B,
each of $R^1$ and $R^2$ is hydrogen, trityl, substituted trityl, or (lower)alkanoyl and
$R^3$ is a purine or pyrimidine base of the structure:

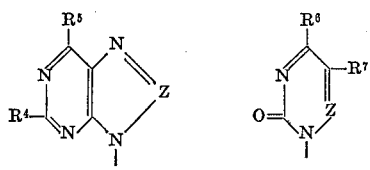

wherein $R^4$ is hydrogen, hydroxy or amino;
each of $R^5$ and $R^6$ is hydroxy or amino;
$R^7$ is hydrogen, halo, methyl, or trifluoromethyl, and
Z is methylidyne or a nitrogen atom.

2. A compound of Formula A of claim 1 wherein each of $R^1$ and $R^2$ is hydrogen and $R^3$ is a group selected from the group consisting of adenine, cytosine, guanine, thymine, and uracil.

3. A compound of Formula A of claim 1 wherein each of $R^1$ and $R^2$ is hydrogen and $R^3$ is the uracil group.

4. A compound of Formula B of claim 1 wherein each of $R^1$ and $R^2$ is hydrogen and $R^3$ is a group selected from the group consisting of adenine, cytosine, guanine, thymine, and uracil.

5. A compound of Formula B of claim 1 wherein each of $R^1$ and $R^2$ is hydrogen and $R^3$ is the uracil group.

6. A process for the preparation of radioactive tritium labelled nucleosides which comprises reducing the corresponding oxonucleoside to the corresponding hydroxytritiated derivative with $^3H$ labelled sodium borohydride.

7. The process according to claim 6 wherein 1-β-D-xylosyl-3'-t-uracil and 3'-t-uridine are prepared from 3'-ketouridine.

8. The process according to claim 6 wherein 1-β-D-arabinosyl-2'-t-uracil and 2'-t-uridine are prepared from 2'-ketouradine.

9. The process according to claim 6 wherein 5'-t-uridine is prepared from uridine-5'-aldehyde.

References Cited

UNITED STATES PATENTS

| | | | |
|---|---|---|---|
| 2,881,164 | 4/1959 | Kissman et al. | 260—211.5 |
| 2,885,396 | 5/1959 | Heidelberger et al. | 260—211.5 |
| 3,014,900 | 12/1961 | Schroeder | 260—211.5 |
| 3,116,282 | 12/1963 | Hunter | 260—211.5 |

OTHER REFERENCES

Pigman "The Carbohydrates," Academic Press Inc., 1957, pp. 135–137, New York, N.Y.

LEWIS GOTTS, Primary Examiner
JOHNNIE R. BROWN, Assistant Examiner

U.S. Cl. X.R.
260—999

UNITED STATES PATENT OFFICE
CERTIFICATE OF CORRECTION

Patent No. 3,491,085  Dated January 20, 1970

Inventor(s) Alan F. Cook, John G. Moffatt

It is certified that error appears in the above-identified patent and that said Letters Patent are hereby corrected as shown below:

Column 1, line 23, "prepartion" should read -- preparation--
Column 1, lines 27 to 32, that portion of Formula (B) reading:

" 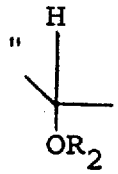 "    should read --  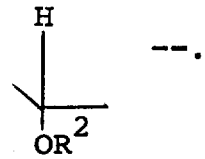 --.

Column 1, lines 38 to 45, that portion of the right-hand Formula reading:

" 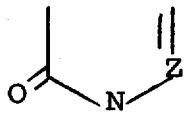 "    should read --  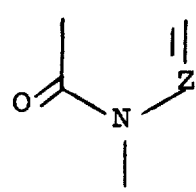 --.

Column 2, line 39, "Whittig" should read -- Wittig --. Column 3, line 67, "2'-keto-1-D-ribofuranosylthymine" should read -- 2'-keto-1-β-D-ribofuranosylthymine --. Column 5, lines 5 to 13, that portion of Formula B reading:

" 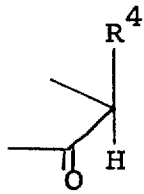 "    should read --  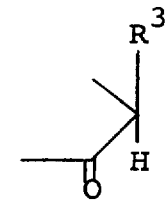 --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents